US012716483B2

(12) United States Patent
Schilder et al.

(10) Patent No.: US 12,716,483 B2
(45) Date of Patent: Aug. 25, 2026

(54) ELECTRIC DRIVE SYSTEM FOR A MOTOR VEHICLE

(71) Applicant: MERCEDES-BENZ GROUP AG, Stuttgart (DE)

(72) Inventors: Tobias Schilder, Ludwigsburg (DE); Tobias Haerter, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 19/122,325

(22) PCT Filed: Oct. 12, 2023

(86) PCT No.: PCT/EP2023/078416

§ 371 (c)(1),
(2) Date: Apr. 18, 2025

(87) PCT Pub. No.: WO2024/083652

PCT Pub. Date: Apr. 25, 2024

(65) Prior Publication Data

US 2026/0153144 A1 Jun. 4, 2026

(30) Foreign Application Priority Data

Oct. 20, 2022 (DE) ..................... 10 2022 003 890.0

(51) Int. Cl.
*F16H 57/04* (2010.01)
*B60K 17/04* (2006.01)
(Continued)

(52) U.S. Cl.
CPC ......... *F16H 57/0486* (2013.01); *B60K 17/04* (2013.01); *F16H 1/28* (2013.01);
(Continued)

(58) Field of Classification Search
CPC ............. F16H 57/0486; F16H 57/0424; F16H 57/0427; F16H 57/043; F16H 57/0476; F16H 57/0479
See application file for complete search history.

(56) References Cited

U.S. PATENT DOCUMENTS 5,597,370 A 1/1997 Nogle
5,910,063 A * 6/1999 Kato .................. F16H 57/0479 475/159

(Continued)

FOREIGN PATENT DOCUMENTS

CN 101338812 A 1/2009
DE 8535076 U1 2/1986

(Continued)

OTHER PUBLICATIONS

International Search Report and Written Opinion mailed Jan. 17, 2024 in related/corresponding International Application No. PCT/EP2023/078416.

(Continued)

*Primary Examiner* — Sherry L Estremsky
(74) *Attorney, Agent, or Firm* — PATENT PORTFOLIO BUILDERS PLLC

(57) ABSTRACT

An electric drive system for a motor vehicle includes an electric motor and a planetary transmission stage. A rotor shaft is non-rotatably connected to a sun gear. A planet carrier has a carrier shaft arranged coaxially and axially adjacent to the rotor shaft. The carrier shaft is mounted relative to a housing by a first bearing. The housing has a circular opening through which the carrier shaft is guided. The housing has a first oil duct opening into the circular opening and the carrier shaft has a rotary feedthrough in the axial region of the opening relative to its axis of rotation. The carrier shaft has at least one first bore extending in the axial direction, which is connected at its one end to the
(Continued)

Figure 1:
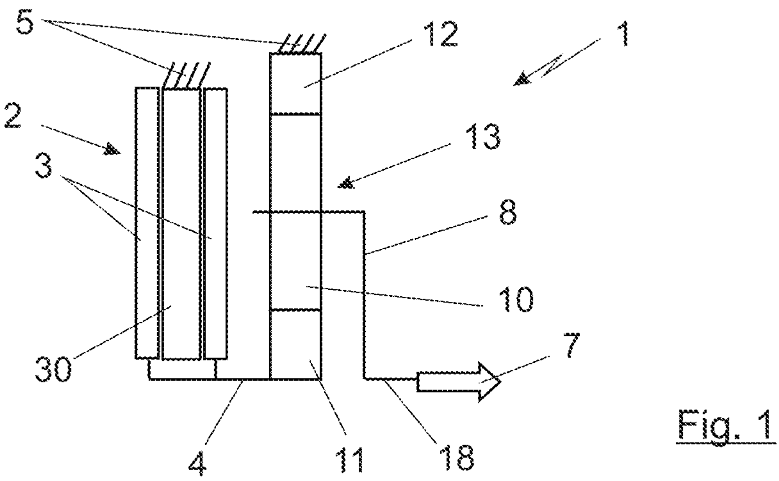

rotary feedthrough. The rotor shaft has an axially extending second bore. The first bore is connected to the second bore.

9 Claims, 1 Drawing Sheet

(51) Int. Cl.
*F16H 1/28* (2006.01)
*F16H 57/021* (2012.01)
*F16H 57/02* (2012.01)

(52) U.S. Cl.
CPC ....... *F16H 57/021* (2013.01); *F16H 57/0424* (2013.01); *F16H 57/0427* (2013.01); *F16H 57/043* (2013.01); *F16H 57/0471* (2013.01); *F16H 57/0476* (2013.01); *F16H 2057/02034* (2013.01); *F16H 2057/02043* (2013.01)

(56) References Cited

U.S. PATENT DOCUMENTS

| | | | | |
|---|---|---|---|---|
| 7,387,588 | B2 | 6/2008 | Bader | |
| 10,655,725 | B2 * | 5/2020 | Kodama | F16H 57/043 |
| 2012/0024107 | A1 | 2/2012 | Sowul et al. | |
| 2016/0265652 | A1 | 9/2016 | Nishimine | |

FOREIGN PATENT DOCUMENTS

| | | | | |
|---|---|---|---|---|
| DE | 10323254 A1 | | 12/2004 | |
| DE | 102009055005 A1 | | 9/2010 | |
| DE | 102013206880 B3 | | 7/2014 | |
| DE | 102014220309 A1 | | 4/2016 | |
| DE | 102019114139 B3 | | 6/2020 | |
| JP | S63197641 U | | 12/1988 | |
| JP | H0893872 A | * | 4/1996 | F16H 57/043 |
| WO | WO-2012159787 A1 | * | 11/2012 | F16H 57/0476 |

OTHER PUBLICATIONS

Office Action created May 31, 2023 in related/corresponding DE Application No. 10 2022 003 890.0.

* cited by examiner

ELECTRIC DRIVE SYSTEM FOR A MOTOR VEHICLE

BACKGROUND AND SUMMARY OF THE INVENTION

Exemplary embodiments of the invention relate to an electric drive system for a motor vehicle having an electric motor and a planetary transmission stage arranged next to it in the axial direction.

Planetary transmission stages, which can be used, for example, in an electric drive system for a motor vehicle, are known from prior art. By way of example, one can refer to DE 10 2019 114 139 B3, which shows a motor vehicle gearbox for coupling an electric motor to a drive train. The planetary transmission stage and the electric motor are axially adjacent to each other. Further planetary transmission stages suitable for electric drive systems are known from DE 8535076 U1, CN 1 01 338 812 A, JP S 63-197 641 U, DE 103 23 254 A1, US 2016/0265652 A1 and U.S. Pat. No. 5,597,370 A.

A planetary transmission stage is known from the generic DE 10 2014 220 309 A1, in which lubricating oil from an oil duct is first fed out of a housing into a carrier shaft of a planet carrier and from there into an axially neighboring and coaxially arranged rotor shaft.

Exemplary embodiments of the present invention are directed to an improved electric drive system having a planetary transmission stage, which is in particular optimized regarding lubricating oil supply.

The electric drive system for a motor vehicle according to the invention comprises the electric motor and a planetary transmission stage with a sun gear, planetary carriers along with associated planetary gears and a ring gear.

The rotor shaft itself is connected or can be connected to the sun gear in a torque-transmitting manner. The rotor shaft can be non-rotatably connected to the sun gear. However, one or more gear ratio stages and/or a switching element can also be arranged between the rotor shaft and the sun gear.

The planet carrier has a carrier shaft arranged coaxially and adjacent in the axial direction to the rotor shaft. The carrier shaft of the planet carrier is mounted by means of a first bearing relative to a housing, which has a circular opening through which the carrier shaft is guided. The housing comprises a first oil duct that opens into this circular opening. In relation to its axis of rotation, the carrier shaft has a rotary feedthrough in the axial region of the opening in order to receive the lubricating oil flowing in through the first oil duct. The carrier shaft also has at least one first bore extending in the axial direction, which is connected at one end to the rotary feedthrough such that the oil can flow through this first bore. The rotor shaft has an axially extending second bore, which is arranged, in particular, coaxially to the rotor shaft and runs inside it. It could also be said that the rotor shaft is designed as a hollow shaft, at least in the section facing the carrier shaft. The first bore in the carrier shaft and the second bore in the rotor shaft are in contact with each other such that the oil, which enters the first bore of the carrier shaft via the rotary feedthrough, can enter the faster-rotating rotor shaft. This allows rotating components installed on the rotor shaft side to be ideally supplied with lubricating oil in a very simple and compact design.

Coaxial, axial, and radial are understood to mean the corresponding arrangements or directions in relation to an axis of rotation of the planetary transmission stage, which could also be referred to as the main axis of rotation. Both the electric motor or its rotor and the elements of the planetary transmission stage, i.e., the sun gear, the ring gear and the planet carrier, rotate around this axis of rotation. If such indications refer to a different axis, for example the axis of rotation of an individual planetary gear, this is explicitly stated in each case.

It is provided that a nozzle is arranged on an end face of the carrier shaft facing the rotor shaft, which opens into the second bore and thus discharges the lubricating oil flowing towards it into the rotor shaft, which typically rotates faster.

In accordance with the invention, a retaining ring is provided, which is arranged within the second bore at least partially axially overlapping the nozzle. Interaction between the nozzle and the retaining ring can prevent lubricating oil from escaping through a gap between the rotor shaft and the carrier shaft. The solution according to the invention eliminates the need for a shaft seal between the carrier shaft and the rotor shaft. A shaft seal to the rapidly rotating rotor shaft would cause significant friction losses.

According to an advantageous further development, it is provided that the retaining ring has a disc section on its end facing the carrier shaft, which extends radially inwards starting from an inner surface of the second bore, wherein the disc section is completely axially overlapped by the nozzle. The disc section effectively prevents lubricating oil from flowing back in the direction of the carrier shaft in a simple and cost-effective manner.

Advantageously, the retaining ring has a cylindrical section abutting a wall of the second bore and which is connected to the disc section.

Advantageously, the disc section has an opening radially on the inside, which is advantageously circular in shape, wherein the nozzle has a second cylindrical section penetrating the opening axially. Both the disc section and the advantageously circular opening are advantageously arranged coaxially to the axis of rotation of the planetary transmission stage.

The term axial overlap means that two at least partially overlapping elements are each arranged at least partially in the same range of axial coordinates. The phrase "radially within" should be understood to mean that a first element is arranged radially within a second element if the first element is arranged in a region of smaller radial coordinates than the second element.

According to a very advantageous further development of the electric drive system according to the invention, the region with the sun gear can be arranged axially adjacent to precisely this nozzle, which, as already explained above, is non-rotatably connected to the rotor shaft. The lubricating oil is therefore supplied via the nozzle in the region of the sun gear, in particular in such a way that the nozzle opening into the second bore of the rotor shaft axially touches or partially overlaps the region of the sun gear.

A non-rotatable connection in the sense of the invention is understood to mean the connection of two coaxial elements in such a way that they rotate at the same angular velocity.

According to a further very favorable embodiment of the electric drive system according to the invention, the first bore is arranged parallel to the axis of rotation of the carrier shaft. The first bore or, if several such bores are present distributed over the circumference, all of these first bores are arranged parallel to the axis of rotation of the carrier shaft. The carrier shaft can, for example, be designed as a hollow shaft in which the first bore or the several first bores are located.

According to an advantageous development of the electric drive system according to the invention, it is provided that the rotor shaft has at least one second oil duct connecting the surface of the rotor shaft to the second bore. Through it, oil from the region of the second bore, which preferably reaches there via the nozzle or the connection between the two bores, which may also be of a different design, reaches the radially outer region of the rotor shaft and can lubricate bearings located there accordingly or is projected radially outwards by the rotation of the rotor shaft in order to supply the corresponding bearings, for example a bearing of the rotor, a second bearing of the planet carrier or the like, with lubricating oil.

This second oil duct can, in particular, be designed radially in order to ensure an ideal flow; in principle, it is also sufficient if it connects the corresponding elements in the manner mentioned, for which purpose its course always also has a radial component, at least in sections.

A further very favorable embodiment of the electric drive system according to the invention also provides that the planetary gears are arranged on planetary gear pins, wherein oil baffle plates are arranged on the planetary gear pins in such a way that oil, which is projected radially outwards from the rotor shaft, is guided through the oil baffle plates into the planetary gear pins, which are designed as hollow cylinders. In this way, lubricating oil reaches the region of the planetary gear pins easily and efficiently. According to a further very favorable embodiment of this variant of the electric drive system according to the invention, it can then be provided that the planetary gear pins have third oil ducts, which connect the interior of the hollow cylinders with the outer surface of the planetary gear pins carrying the planetary carriers. The oil led into the interior of the hollow cylinders via the oil baffle plates thus reaches the outer surfaces of the planetary gear pins, on which the planetary gears with their corresponding bearings are arranged. The oil can then lubricate the planetary gears or their bearings accordingly, wherein the third oil ducts also preferably correspondingly run from radially inwards to radially outwards, in relation to the axis of rotation of the planetary transmission stage, in order to favor the delivery of the oil by centrifugal forces.

According to a further very favorable embodiment of the electric drive system according to the invention, it can now also be provided that fourth oil ducts are arranged in the housing radially outside the ring gear. Via such fourth oil ducts, which can also run radially but do not have to, lubricating oil can now be discharged accordingly from the region of the electric motor and the planetary transmission stage in order to return to a lubricating oil circuit and, for example, after passing through a filter and a conveying device via the first oil duct, be fed back to the rotary oil feedthrough and thus indirectly to the interior of the rotor shaft as the starting point for the described lubrication.

A further advantageous design of the electric drive train according to the invention can further provide that the housing comprises a base housing and a housing cover, wherein the first oil duct is arranged in a wall of the housing cover, preferably in such a way that the first oil duct runs at least partially parallel to the surface of the wall. In this way, the oil is guided simply and efficiently through the housing cover to the rotary oil feedthrough of the carrier shaft, wherein the oil ducts, as just indicated, can in particular provide a circulation of the oil.

Further advantageous designs of the planetary transmission stage as well as the electric drive system for a motor vehicle emerge from the exemplary embodiments, which are described in more detail below with reference to the figures.

BRIEF DESCRIPTION OF THE DRAWING FIGURES

Figure 2:
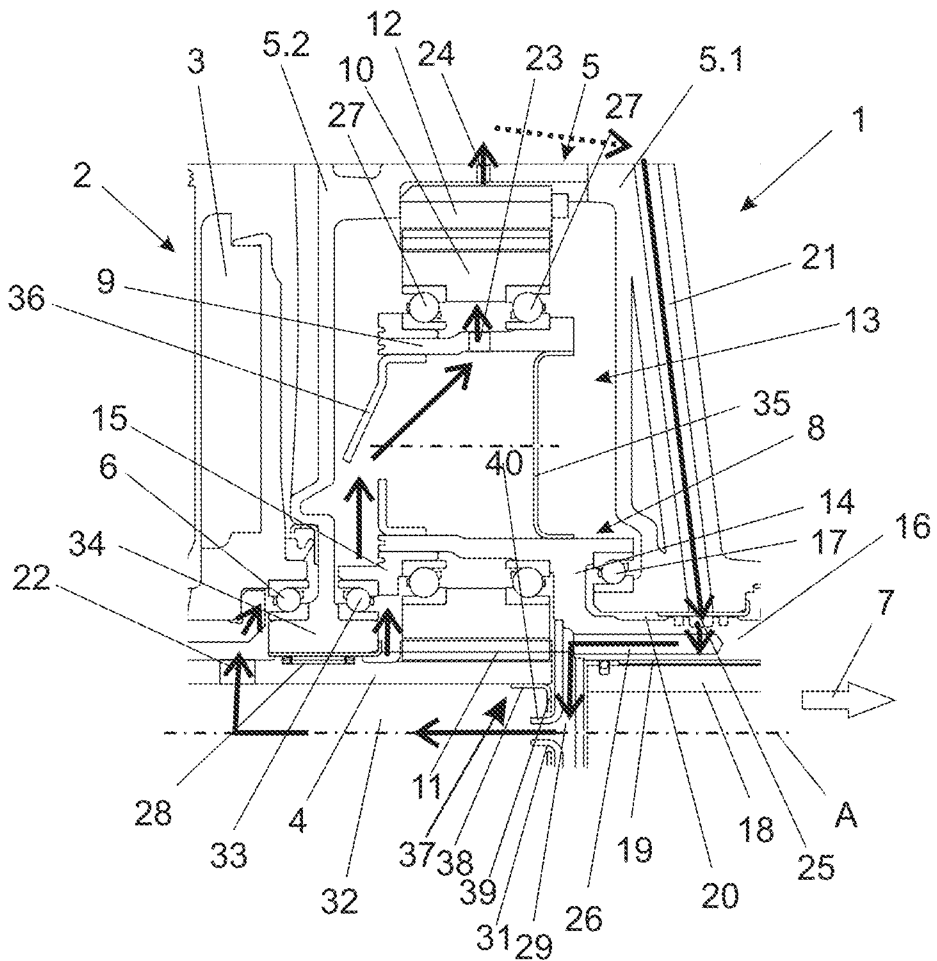

Here are shown:

FIG. 1 a schematic depiction of an electric drive system for a motor vehicle in an embodiment according to the invention; and FIG. 2 a sectional depiction of a section of the electric drive system having an implementation of the planetary transmission stage according to the invention.

DETAILED DESCRIPTION

An electric drive system 1 is illustrated in the depiction of FIG. 1. It has an electric motor 2, which is designed as an axial flux machine, for example. This comprises a stator 30, which is non-rotatably arranged here opposite a housing 5, and a two-part rotor 3, which is non-rotatably connected to a rotor shaft 4. The rotor shaft 4 forms the input shaft into a planetary transmission stage 13 and is non-rotatably connected to a sun gear 11 or can be connected if required, which is not explicitly depicted here. The planetary transmission stage 13 also comprises a ring gear 12, which is non-rotatably connected to the housing 5. A planet carrier 8 is non-rotatably connected to an output shaft 18, which discharges power from the electric drive system 1, as depicted by the output labelled 7 and indicated by an arrow in the depiction of FIG. 1.

The electric drive system 1 is depicted as a section in the depiction of FIG. 2. The rotor 3, of which only the half located to the right in the electric motor 2 or to the right of the stator 30 is correspondingly depicted here, is mounted relative to a housing 5 via a rotor bearing 6, which is advantageously designed as a roller bearing, particularly advantageously as an angular contact ball bearing. It is non-rotatably connected to a rotor shaft 4, which is designed in several parts. It is mounted indirectly via the rotor bearing 6 of the rotor 3 and is also supported on the housing via a needle bearing 28. On the side of the electric motor 2 facing away in an axial direction a, the output 7 to the gear of the motor vehicle or an axle drive—e.g., a differential—is depicted schematically. This output 7 is non-rotatably connected via the output shaft 18 by means of splined shaft toothing 19 to a planetary gear carrier 8 as an output element of a planetary transmission stage 13.

The axial direction a is arranged parallel to an axis of rotation A of the planetary transmission stage 13. The axis of rotation A is the common axis of rotation of the sun gear 11, the ring gear 12, and the planet carrier 8. Particularly advantageously, the rotor 3 of the electric motor 2 is also arranged coaxially to the axis of rotation A and thus coaxially to the planetary transmission stage 13.

The planet carrier 8 has planetary gear pins 9 projecting in axial direction a in the orientation of the electric motor 2. Planetary gears 10 are each mounted on these planetary gear pins 9 via a planetary gear bearing device 27, which is designed here in the form of two angular contact ball bearings in each case. A sun gear 11, which is formed by a toothing of the rotor shaft 4, meshes radially on the inside with the planetary gears 10. A ring gear 12 completes this structure to form the planetary transmission stage 13 for converting the torque between the rotor 3 and the output 7. The ring gear 12 is non-rotatably connected to the housing 5.

The planet carrier 8 therefore comprises the planetary gear pins 9, which are non-rotatably connected to a component 14 of the planet carrier 8 known as the crosspiece. In the exemplary embodiment depicted here, the planetary gears 10 are mounted on the planetary gear pins 9 together with the two angular contact ball bearings of the planetary gear bearing device 27. Alternatively, a single roller bearing could also be provided, for example. The planet carrier 8 consisting of the crosspiece 14 and the planetary gear pin 9 is designed as a one-piece forged part. Once the planetary gears 10 and the two angular contact ball bearings of the planetary gear bearing device 27 have been fitted, a crosspiece gland 15 is placed on the side of the planet carrier 8 facing away from the crosspiece 14. After the planetary gears 10 have been fitted, a pretension can now be applied to the angular contact ball bearings of the planetary gear bearing device 27 by pressing the crosspiece gland 15 onto the crosspiece 14. The crosspiece gland 15 is then welded to the crosspiece 14 in this pretensioned position.

A part of the planet carrier 8 surrounding the output shaft 18 can be recognized in the axial direction a of the axis of rotation A on the right in the depiction of FIG. 1. This is designed as a carrier shaft 16, which is mounted relative to the housing 5, and here in particular a part of the housing 5 designed as a housing cover 5.1, by means of a first bearing 17, which is also designed here as an angular contact ball bearing. The planet carrier 8 or its crosspiece 14 rests with an outer support ring on the first bearing 17, which is supported on the inside in a radial direction on a housing ring, which is part of said housing cover 5.1. The housing cover 5.1 then completes the aforementioned housing 5 together with a lower housing part 5.2.

The carrier shaft 16 runs through a circular opening 20 of the housing 5 or the housing cover 5.1. A first oil duct 21 is arranged in the housing cover 5.1 and runs parallel to its walls, at least in sections. In the depiction in FIG. 2, it runs diagonally from the top left in the housing cover 5.1 to the bottom right. The carrier shaft 16 has a rotary feedthrough 25 in the region in which the first oil duct 21 opens into the circular opening 20. This is connected to a first bore 26, which is introduced parallel to the axis of rotation A into the carrier shaft 16. As indicated by the arrows, lubricating oil can now flow into the first bore 26 via the first oil duct 21 and the rotary feedthrough 25 and spreads to the left as seen in the axial direction a in the depiction of FIG. 2. The oil can now reach the region of the axis of rotation A via a radial channel 29 or a corresponding disc-shaped open region of the carrier shaft 16. A nozzle 31 is arranged there in the region of the carrier shaft 16, which establishes a connection between the first bore 26 into the region of a second bore 32, which is designed as a central coaxial bore in the rotor shaft 4. The oil can now flow from the comparatively slowly-rotating carrier shaft 16 of the planet carrier 8 via this nozzle 31 into the second bore 32 of the significantly faster-rotating rotor shaft 4 or be injected into it.

In addition to the nozzle 31, a retaining ring 37 is provided, which is arranged within the second bore and at least partially axially overlapping the nozzle. The interaction of the nozzle 31 and the retaining ring 37 prevents lubricating oil from escaping through a gap between the rotor shaft 4 and the carrier shaft 16.

The retaining ring 37 advantageously has a disc section 39 on its end facing the carrier shaft 16, which extends radially inwards from an inner surface of the second bore 32, wherein the disc section 39 is completely axially overlapped by the nozzle 31.

Advantageously, the retaining ring 37 has a cylindrical section 38 abutting a wall of the second bore 32 and which is connected to the disc section 39.

Advantageously, the disc section 39 has an opening radially on the inside, which is advantageously circular, wherein the nozzle 31 has a second cylindrical section 40, which penetrates the opening axially.

A second oil duct 22 now connects this second bore in radial direction r with an outer surface of the rotor shaft 4 as seen in radial direction r. Lubricating oil can now escape from this second oil duct 22 and reaches the area of the rotor bearing 6 for the rotor shaft 4, as well as through the needle bearing 28 into the region of the sun gear 11. The oil can thus lubricate the rotor 3 of the electric motor 2 or its rotor bearing 6 accordingly on the one hand and a second bearing 33 of the planet carrier 8, which is arranged between the crosspiece gland 15 and a housing ring 34 of the lower housing part 5.2, on the other. Any remaining oil is thrown radially outwards by the centrifugal forces and the rapidly rotating rotor shaft 4. In the region of the planetary gear pins 9, which are hollow cylindrical and are correspondingly closed on the crosspiece side by a plate 34 or the material of the crosspiece 14, there is now an oil baffle plate 36 on the crosspiece gland side, which is arranged in such a way that oil thrown radially outwards is collected and channeled into the hollow cylinder. A third radial oil duct 23 is then located in each of the hollow cylindrical planetary gear pins 9, which connects the inner volume of the hollow cylinder with its outer surface in a radially outward direction. The two angular contact ball bearings of the planetary gear bearing device 27 already mentioned above are arranged in this region and thus benefit from the lubricating oil flowing through the third oil duct 23 to lubricate the bearings of the planetary gears 10.

Ultimately, the centrifugal forces acting in the lower housing part 5.2 or the housing 5 cause the oil to move further and further outwards in the depiction in FIG. 1, in particular upwards in the depiction in FIG. 2 and downwards in the region below the axis of rotation A, which is not depicted. A fourth oil duct 24 can optionally be provided there, via which the remaining oil can be drained to the outside of the housing 5. It can then be recirculated, for example after cleaning, and fed back to the electric drive device 1 via the first oil duct 21 in order to run through the path just described again. This enables very good lubrication of both the planetary transmission stage 13 and the electric motor 2.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST

1 electric drive system
2 electric motor
3 rotor
4 rotor shaft
5 housing
5.1 housing cover
5.2 lower housing part
6 rotor bearing
7 output
8 planet carrier
9 planetary gear pins
10 planetary gears
11 sun gear
12 ring gear
13 planetary transmission stage
14 crosspiece
15 crosspiece gland
16 carrier shaft
17 first bearing
18 output shaft
19 splined shaft toothing
20 circular opening
21 first oil duct
22 second oil duct
23 third oil duct
24 fourth oil duct
25 rotary feedthrough
26 first bore
27 planetary gear bearing device
28 needle bearing
29 radial channel
30 stator
31 nozzle
32 second bore
33 second bearing
34 housing ring
35 plate
36 oil baffle plate
37 retaining ring
38 cylindrical section
39 disc section
40 second cylindrical section
A axis of rotation
a axial direction
radial direction

The invention claimed is:

1. An electric drive system for a motor vehicle, the electric drive system comprising:

an electric motor comprising a rotor, which includes a rotor shaft;

a planetary transmission stage comprising a sun gear, a planet carrier and associated planetary gears, and a ring gear, wherein the rotor shaft is connected or is connectable to the sun gear in a torque-transmitting manner, wherein the planet carrier has a carrier shaft arranged coaxially and axially adjacent to the rotor shaft, wherein the carrier shaft is mounted relative to a housing by a first bearing, wherein the housing has a circular opening through which the carrier shaft is guided, wherein the housing has a first oil duct opening into the circular opening, wherein the carrier shaft has a rotary feedthrough in an axial region of the opening relative to an axis of rotation of the carrier shaft, wherein the carrier shaft has at least one first bore extending in the axial direction, wherein the at least one first bore is connected at one end to the rotary feedthrough, wherein the rotor shaft has an axially extending second bore, wherein the first bore is connected to the second bore, and wherein a nozzle, which opens into the second bore, is arranged on an end face of the carrier shaft facing the rotor shaft;

a retaining ring arranged within the second bore at least partially axially overlapping the nozzle, wherein the retaining ring has, on an end facing the carrier shaft, a disc section extending radially inwards from an inner surface of the second bore, wherein the disc section is completely axially overlapped by the nozzle.

2. The electric drive system of claim 1, wherein the sun gear is arranged in a region arranged axially adjacent to the nozzle.

3. The electric drive system of claim 1, wherein the first bore is arranged parallel to the axis of rotation of the carrier shaft.

4. The electric drive system of claim 1, wherein the rotor shaft has at least one second oil duct connecting a radially outer surface of the rotor shaft to the second bore.

5. The electric drive system of claim 1, wherein the planetary gears are arranged coaxially to planetary gear pins, wherein oil baffle plates are arranged on the planetary gear pins in such a way that oil, which is thrown radially outwards from the rotor shaft, is channeled into the planetary gear pins, and wherein the planetary gear pins are hollow cylinders.

6. The electric drive system of claim 5, wherein the planetary gear pins have third oil ducts connecting an interior of the hollow cylinders to the outer surfaces of the planetary gear pins carrying the planetary gears.

7. The electric drive system of claim 6, further comprising:

at least one fourth oil duct arranged radially outside the ring gear and axially overlapping this in the housing.

8. The electric drive system of claim 7, wherein at least one of the second, third, or fourth oil ducts extends in the radial direction.

9. The electric drive system of claim 1, wherein the housing has a lower housing part and a housing cover, wherein the first oil duct is arranged in a wall of the housing cover, and wherein the first oil duct runs at least partially parallel to an outer surface of the wall of the housing cover.

* * * * *